Aug. 21, 1923.

E. E. ARNOLD 1,465,569

RATCHET JACK SHAFT BRAKE

Filed Jan. 28, 1920

WITNESSES
J. Herbert Bradley

INVENTOR
Edwin E. Arnold
By Jno. S. Green
His Atty.

Patented Aug. 21, 1923.

1,465,569

UNITED STATES PATENT OFFICE.

EDWIN E. ARNOLD, OF PITTSBURGH, PENNSYLVANIA, ASSIGNOR TO REES MANUFACTURING COMPANY, A CORPORATION OF PENNSYLVANIA.

RATCHET-JACK-SHAFT BRAKE.

Application filed January 28, 1920. Serial No. 354,730.

*To all whom it may concern:*

Be it known that I, EDWIN E. ARNOLD, a citizen of the United States, and a resident of Pittsburgh, in the county of Allegheny and State of Pennsylvania, have made a new and useful Improvement in Ratchet-Jack-Shaft Brakes, of which the following is a specification.

My invention relates to jacks of the type operated by a ratchet driven, rotating shaft and consists in a braking device for the shaft of such a jack.

At present, if a jack operating shaft rotates very freely in its bearings and there is friction between it and a pawl support rotatably mounted on the shaft, the return movement of the pawl support to enable the pawl to engage a new tooth is likely to be accompanied by a corresponding movement of the shaft which neutralizes the return movement of the pawl and its support.

The object of my invention is to prevent the rotation of the shaft except when positively engaged by the ratchet pawl.

Figure 1:
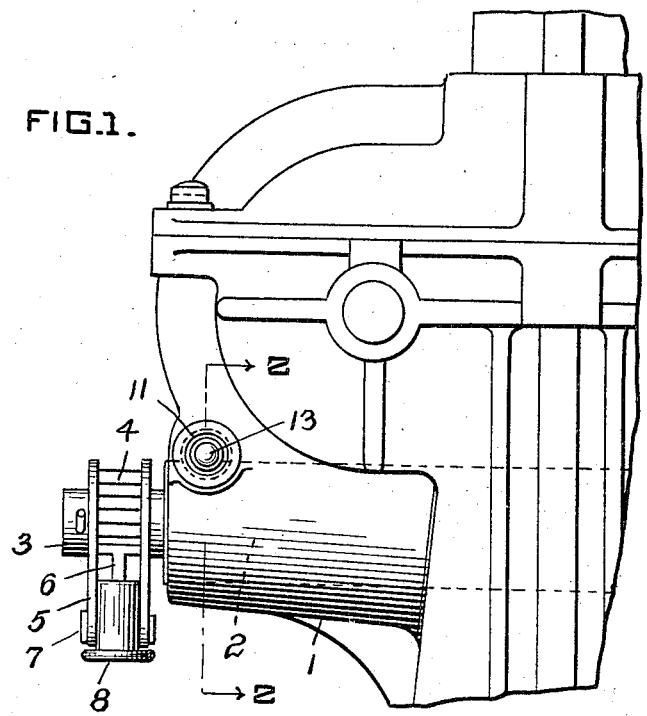
Figure 2:
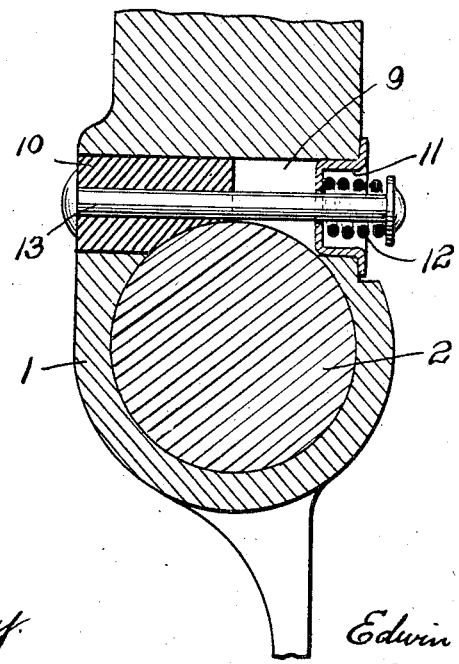

In the accompanying drawings, Figure 1 is a side elevation of a portion of a jack of the type referred to above with my brake device applied and Fig. 2 is an enlarged, transverse, vertical section on line 2—2 of Fig. 1.

The jack, shown in part, is worm driven and the frame of the jack is provided with a journal bearing 1 for the worm shaft 2. The visible end of the worm shaft terminates in a pawl support trunnion 3 provided with an integral ratchet wheel 4. The pawl support 5 mounts a reversible pawl 6, pivoted on the support at 7 and provided with a lever handle socket 8. By means of the handle (not shown) the ratchet wheel and worm operating shaft may be positively driven in either direction.

A passage 9 extends thru the jack frame, transversely of shaft 2 and intersects journal bearing 1 so that a segment of shaft 2 extends into the passage as best shown in Fig. 2. A shoe 10 slides freely in passage 9 on one side of shaft 2 and has an arcuate surface formed thereon adapted to contact with a substantial part of the exposed surface of the shaft. The end of passage 9 opposite the portion accommodating shoe 10 receives a flanged cup 11 which has a bearing on the outside of the frame and affords a seat for coil spring 12. A rivet 13 passes thru shoe 10, cup 11 and spring 12, compressing the latter and drawing shoe 10 against the surface of shaft 2.

The frictional contact of shoe 10 and shaft 2 is sufficient to prevent rotation of the latter unless positively engaged by the ratchet pawl but is insufficient to materially interfere with intentional rotation. When pawl support 5 is rotated to move its ratchet pawl to a new tooth-engaging position, the brake device prevents the integral rotation of shaft 2. The advantage of this device is apparent and will be appreciated by those familiar with the sticking tendencies of assembled parts having the same or similar operation.

The location of a jack is often inconvenient and sometimes inaccessible or positively dangerous. In such an event no one wants to reach the jack and hold the shaft while a return movement of the pawl is effected even if such manipulation is possible. The use of my device obviates the necessity for such undesirable action. My brake is simple and economical and does not require any extensions on the normal frame of the jack and only the slightest of additional work thereon for installation.

I claim:—

1. In combination in a jack, a frame having a brake shoe guide formed therein, an operating mechanism associated with said frame, a brake shoe located in said guide and slidable therealong to engage a rotatable member of said operating mechanism, and a spring for yieldingly pressing said shoe against said member.

2. In combination in a jack, a frame having a brake shoe guide formed therein, an operating shaft associated with said frame and extending transversely of said guide so that a portion thereof is exposed across said guide, a brake shoe located within said guide and slidable transversely of said shaft, and a spring for holding said shoe in engagement with said shaft.

3. In a jack, a drive shaft, a journal bearing for said shaft, a brake shoe slidable transversely of said bearing adapted to bear against one side of said shaft, a spring positioned on the other side of said shaft, and means connecting said shoe and said spring and compressing the latter.

4. In a jack frame, a drive shaft journaled in said frame, said frame being provided with a passage extending transversely of and exposing said shaft, a brake shoe positioned in the passage at one side of said shaft, a cup in said passage on the other side of said shaft, a coil spring seated on the side of said cup facing away from said shoe, and a connection between said shoe and said spring adapted to hold said shoe against said shaft by the compression of said spring.

5. In a jack, a frame, a drive shaft journaled in said frame, a brake shoe on one side of said shaft, a spring seat on the other side of said shaft, a spring bearing on the side of said seat facing away from said shoe and a member holding said shoe against said shaft by the distortion of said spring.

6. In combination in a jack, a frame having a brake-shoe guide extending therethrough, an operating shaft journaled in said frame and extending transversely across said guide, a brake shoe located in said guide on one side of said shaft, a spring support mounted on the frame in substantial alignment with said guide on the other side of said shaft, a spring engaging said support, and an element extending through said shoe, said spring support and said spring for compressing said spring.

In testimony whereof, I have hereunto subscribed my name this 19 day of January, 1920.

EDWIN E. ARNOLD.